US012330158B2

(12) United States Patent
Cyr et al.

(10) Patent No.: US 12,330,158 B2
(45) Date of Patent: Jun. 17, 2025

(54) FLUID EJECTION DIE WITH ANTECHAMBER SIDEWALLS THAT CURVE INWARD

(71) Applicant: Hewlett-Packard Development Company, L.P., Spring, TX (US)

(72) Inventors: Kathryn H. Cyr, Corvallis, OR (US); Debora J. Thomas, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 623 days.

(21) Appl. No.: 17/782,840

(22) PCT Filed: Mar. 30, 2020

(86) PCT No.: PCT/US2020/025728

§ 371 (c)(1),
(2) Date: Jun. 6, 2022

(87) PCT Pub. No.: WO2021/201824

PCT Pub. Date: Oct. 7, 2021

(65) Prior Publication Data

US 2023/0015600 A1 Jan. 19, 2023

(51) Int. Cl.

*B01L 3/00* (2006.01)
*B41J 2/135* (2006.01)

(52) U.S. Cl.

CPC . *B01L 3/502761* (2013.01); *B01L 2200/0652* (2013.01); *B01L 2200/0663* (2013.01); *B01L 2300/0645* (2013.01); *B01L 2300/0877* (2013.01); *B01L 2400/0406* (2013.01)

(58) Field of Classification Search

CPC ....... B01L 3/502761; B01L 2200/0652; B01L 2200/0663; B01L 2300/0645; B01L 2300/0877; B01L 2400/0406; B01L 2400/0442; B01L 3/0268; B41J 2/14153; B41J 2002/14459; B41J 2/1404; B41J 2202/20

See application file for complete search history.

(56) References Cited

U.S. PATENT DOCUMENTS

| | | | |
|---|---|---|---|
| 9,863,913 | B2 | 1/2018 | Pollack |
| 10,125,393 | B2 | 11/2018 | Esfandyarpour et al. |
| 10,508,299 | B2 | 12/2019 | Hansen et al. |
| 2009/0096839 | A1 | 4/2009 | Olbrich et al. |
| 2009/0267990 | A1 | 10/2009 | Lee et al. |
| 2015/0035904 | A1 | 2/2015 | North |

(Continued)

FOREIGN PATENT DOCUMENTS

| | | | |
|---|---|---|---|
| JP | 2005-001379 | A | 1/2005 |
| WO | 9622884 | | 8/1996 |

(Continued)

*Primary Examiner* — Brian J. Sines
(74) *Attorney, Agent, or Firm* — Foley & Lardner LLP

(57) ABSTRACT

In one example in accordance with the present disclosure, a fluid ejection die is described. The fluid ejection die includes a fluid feed slot to deliver fluid from a reservoir to an array of ejection chambers fluid connected to the fluid feed slot. Each ejection chamber includes at least one fluid actuator and an opening through which fluid is to be ejected. The fluid ejection die also includes a number of antechambers. An antechamber includes sidewalls that curve inward.

15 Claims, 6 Drawing Sheets

(56) References Cited

U.S. PATENT DOCUMENTS

| | | | |
|---|---|---|---|
| 2016/0339700 | A1 | 11/2016 | Kodoi et al. |
| 2018/0003611 | A1 | 1/2018 | Sells et al. |
| 2018/0010179 | A1 | 1/2018 | Hansen et al. |

FOREIGN PATENT DOCUMENTS

| | | | | |
|---|---|---|---|---|
| WO | WO2012/149314 | A1 * | 11/2012 | ............... G01N 7/00 |
| WO | 2018/022022 | A1 | 2/2018 | |
| WO | 2018/208276 | A1 | 11/2018 | |
| WO | 2019/194790 | A1 | 10/2019 | |

* cited by examiner

FLUID EJECTION DIE WITH ANTECHAMBER SIDEWALLS THAT CURVE INWARD

BACKGROUND

A fluid ejection die is a component of a fluid ejection system that ejects fluid from a reservoir onto a surface. To eject the fluid, the fluid ejection die includes a number of components. Specifically, the fluid to be ejected is held in an ejection chamber. A firing resistor operates to dispel the fluid in the ejection chamber through an opening. After the fluid is expelled, capillary forces within the ejection chamber draw additional fluid into the ejection chamber, and the process repeats.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
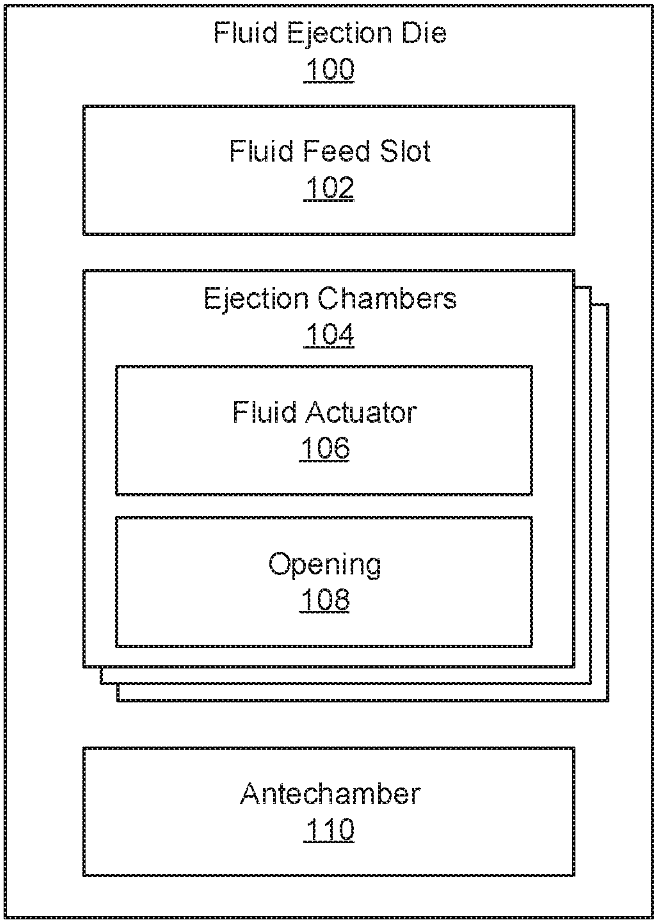
FIG. 1 is a block diagram of a fluid ejection die with antechamber sidewalls that curve inward, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A fluid ejection die is a component of a fluid ejection system that ejects fluid from a reservoir onto a surface. Such fluid ejection die are used in many applications. In one example, the fluid ejection die may be used in a laboratory to process and analyze biological fluids. In general, such processing and analysis is initiated by dispensing small amounts of a sample fluid onto a target surface such as into wells of a titration plate. The fluid in these wells can then be processed and analyzed.

While such assays undoubtedly are a valuable tool in all sorts of life science fields, advances to this area may increase the value they provide. For example, in general, these assays have been performed manually. That is, a user fills fluid into a single channel pipette, or a multi-channel pipette, and manually disperses a prescribed amount of fluid from the pipette into various wells of a titration plate. As this process is done by hand, it is tedious, complex, and inefficient. For example, there may be pipetting error and compounding error. That is, pipette usage has a certain percentage of inaccuracy. Moreover, multiple dilution operations may increase the amount of error early on. Still further, such manual deposition of fluid may be incapable of dispensing low volumes of fluid, for example in the picoliter range.

Accordingly, the present specification describes a fluid ejection die that reduces a likelihood for human error, reduces compounding error as multiple dilution operations are replaced by direct titration, allows dispensing of low volume quantities of fluid, and is usable in various life science applications. Specifically, the present specification describes a fluid ejection die that may be used in a benchtop instrument that dispenses picoliter quantities of fluids into well-plates, or other vessels, using disposable cassettes. A cassette contains any number of fluid ejection devices, each of which may be specifically tailored for laboratory research.

However, such fluidic die may be particularly tailored for use with certain type of biofluids. For example, some benchtop devices allow for the dispensing of dimethyl sulfoxide (DMSO)-based small molecule compounds and of biological fluids containing aqueous-based biomolecules such as proteins, lipids, and oligos. Along the path, the biofluid passes through a funnel-shaped region within the fluid ejection die before being ejected from the cassette and into the well of the well-plate.

This funnel-shaped region may negatively impact the study of certain cells, such as live mammalian cells. That is, this funnel-shaped region may be the narrowest region within the microfluidic device. The narrow channel dimensions may cause cells to experience an increased amount of shear stress. Shear stress can cause morphological changes within the cell, reorganization of the cell cytoskeleton, induce cellular division, alter cell signaling pathways, alter gene/protein expression, and even initiate apoptosis. Accordingly, cell viability is reduced, which impacts any subsequent analysis. Even if a cell is not destroyed, the alterations to its makeup may skew any resultant analytic output.

In addition to potentially effecting the cells themselves, the flow through the fluid ejection die is also affected when certain cells are passed therethrough. For example, if a cell experiences too much shear stress, it may rupture causing DNA to spill out. The content of the DNA thus aggregates outside of a cell and can clog the fluid path and impeding the flow of cells or other fluid therethrough. Moreover, structures such as pillars and right angles can capture debris and cause the cells to get stuck, thus impeding fluid flow through the fluid ejection device even more.

Accordingly, the present specification describes an antechamber that reduces the shear stress imposed upon the cells as they pass, thus enabling the dispensing of cells into specified locations. Such a fluid ejection die can sense and dispense individual live cells into a well-plate or other vessels using electrodes. Such a system optimizes the shape of this funnel region for single cell dispensing, specifically dispensing the cells with high viability.

In general, a fluid ejection system of the present specification includes a cassette that includes multiple fluid ejection devices. The fluid travels through the microfluidic channels inside the fluid ejection device, through a funnel-shaped antechamber leading into an ejection chamber where it resides until it is ejected through an opening at the bottom of the ejection chamber.

As described above, the antechamber of the present specification avoids cellular effects of too much shear stress. That is, the present specification describes a fluid ejection device specific for cell dispensing. Specifically, the fluid ejection die includes an antechamber that does not contain sharp, right angled corners, and instead is smoothed out. As described above, the sharp corners increase the amount of shear stress felt by the cell because of the disruption of fluid flow, especially if there is a clump of cells attempting to squeeze through the stress zone at the same time. The smoothed edges allow for less fluid flow disruption and decrease the chance of the cell experiencing the negative effects of high shear stress.

Specifically, the present specification describes a fluid ejection die. The fluid ejection die includes a fluid feed slot to receive fluid from a reservoir and an array of ejection chambers fluidly connected to the fluid feed slot. Each ejection chamber includes 1) at least one fluid actuator, an opening through which fluid is to be ejected. The fluid ejection die also includes a number of antechambers to direct fluid towards the ejection chambers. An antechamber includes sidewalls that curve inward.

In an example, an antechamber outlet is narrower than other portions of the antechamber. In some examples, the fluid ejection die further includes a corridor per antechamber to direct fluid to multiple ejection chambers. A sensor may be disposed in at least one of the antechamber, the fluid feed slot, and the corridor.

In some examples, different antechambers on the fluid ejection die are sized differently. A size of an antechamber may be selected based on at least one of: a type of a cell to be ejected, a size of the cell to be ejected, a downstream operation to carry out on the cell to be ejected, and a desired level of shear stress to apply to the cell to be ejected.

In some examples, an antechamber outlet has a cross-sectional area between 65% and 75% of a diameter of a cell to be ejected from a respective ejection chamber. Each fluid actuator may be individually actuatable to draw fluid to a respective ejection chamber.

The present specification also describes a fluid ejection device. The fluid ejection device includes a reservoir to receive a quantity of fluid and at least one fluid ejection die. Each fluid ejection die includes a fluid feed slot to receive fluid from the reservoir and an array of ejection chambers fluidly connected to the fluid feed slot to receive fluid from the fluid feed slot. Each ejection chamber includes at least one fluid actuator to eject fluid through an opening, the opening through which fluid is to be ejected. Each fluid ejection die also includes a number of antechambers, wherein an antechamber includes sidewalls that curve inward.

In some examples, the reservoir is an open reservoir. The reservoir may be on an opposite surface of a respective fluid ejection die. Ejection chambers may be disposed on either side of the fluid feed slot. In some examples, the antechamber may be free of acute angle corners and right-angle corners.

The present specification also describes a fluid ejection system. The fluid ejection system includes a number of fluid ejection devices. Each fluid ejection device includes a reservoir to receive a quantity of fluid and at least one fluid ejection die. The fluid ejection die include a fluid feed slot to receive fluid from the reservoir and an array of ejection chambers fluidly connected to the fluid feed slot to receive fluid from the fluid feed slot. Each ejection chamber includes at least one fluid actuator to eject fluid through an opening, the opening through which fluid is to be ejected, and a number of antechambers, wherein an antechamber includes sidewalls that curve inward. The fluid ejection system also includes a frame to retain the number of fluid ejection devices.

In some examples, each antechamber is sized to impart a predetermined level of shear stress on cells that flow to a respective ejection chamber.

While specific reference is made to a fluid ejection die for use in life science applications, the fluid ejection die can be used in other applications, such as deposition of ink on a substrate, or depositing other types of fluid.

In summary, using such a fluid ejection die 1) provides an inkjet-based cell dispense operation with reduced shear force; 2) decreases the likelihood of the cells experiencing adverse effects; 3) provides a smooth antechamber to reduce a likelihood of cells clogging the sense zone and thus increases fluid ejection device life; 4) achieves a desired amount of applied shear stress to make cell walls permeable for applications such as transfection; 5) provides a single fluid ejection device with multiple different antechamber geometries tailored for different applications to allow a single product to be used in different applications rather than requiring a different product for each application; and 6) enhances single cell identification by the dispenser. However, the devices disclosed herein may address other matters and deficiencies in a number of technical areas.

As used in the present specification and in the appended claims, the term "a number of" or similar language is meant to be understood broadly as any positive number including 1 to infinity.

Moreover, as used in the present specification and in the appended claims, the term "curve inward" indicates that the sidewalls of the antechamber curve towards a center line of the antechamber. FIG. 4B depicts an example of the centerline and the inwardly curving antechamber.

Turning now to the figures, FIG. 1 is a block diagram of a fluid ejection die (100) with antechamber (110) sidewalls that curve inward, according to an example of the principles described herein. In general, a fluid ejection system ejects fluid onto a surface. As described above, the surface may be a titration plate with a number of wells, and the fluid may be deposited into the individual wells of the titration plate.

The present systems and devices can be used to deposit fluid on other substrates or surfaces such as microscope slides, matrix assisted laser desorption/ionization (MALDI) plates, and titration plates among other substrates or surfaces.

A variety of fluids may be deposited. For example, the fluid ejection system may be implemented in a laboratory and may eject biological fluid. For example, the biological fluid may include live cells that are to be analyzed. Cells that become unviable, i.e., dead, are not useful in cellular analytics. Moreover, shear forces on the cell that are greater than a certain amount may affect the cell in such a way as to obfuscate the results of any cellular analysis. For example, shear stress can cause morphological changes within the cell, reorganize the cell cytoskeleton, induce cellular division, alter cell signaling pathways, and alter gene/protein expression, each of which may affect the way a cell reacts under different circumstances. In other words, shear stress introduces uncertainty into a sample to be analyzed, which decreases the reliability and accuracy of any resultant analysis. Moreover, as described above, the shear stress may be so great as to rupture a cell membrane rendering it unviable. Accordingly, the fluid ejection die of the present specification provides a structure that minimally impacts live cell viability.

To eject the fluid, a fluid ejection controller passes control signals and routes them to fluid ejection die (100) of the fluid ejection system. A fluid ejection die (100) refers to the component of a fluid ejection system that ejects the fluid. In some cases, the fluid ejection die (100) operates to dispense picoliter quantities of a target fluid into the wells. A fluid ejection die (100) may be paired with a reservoir to be referred to as a fluid ejection device.

The fluid ejection die (100) includes a number of components to eject fluid. First, each fluid ejection die (100) includes a fluid feed slot (102) to receive fluid from a reservoir. The fluid feed slot (102) delivers fluid from a reservoir of a fluid ejection device to the ejection chambers (104) of the fluid ejection die (100). In some examples, the fluid feed slot (102) may deliver fluid to an array of ejection chambers (104).

Each fluid ejection die (100) also includes an array of ejection chambers (104) fluidly connected to the fluid feed slot (102). An ejection chamber (104) holds an amount of fluid to be ejected. Each ejection chamber (104) includes a number of components. For example, an ejection chamber (104) includes at least one fluid actuator (106). The fluid actuator (106) may include a firing resistor or other thermal device, a piezoelectric element, or other mechanism for ejecting fluid from the ejection chamber (104). For example, the fluid actuator (106) may be a firing resistor. The firing resistor heats up in response to an applied voltage. As the firing resistor heats up, a portion of the fluid in the ejection chamber (104) vaporizes to generate a bubble. The bubble generated by the fluid actuator (106) pushes fluid out an opening (108) and onto a target surface. After the fluid ejection event, fluid is drawn into the ejection chamber (104) from a passage that connects ejection chambers (104) to the fluid feed slot (102). In this example, the fluid ejection die (100) may be a thermal inkjet (TIJ) fluid ejection die (100). While specific reference is made to a TIJ fluid ejection die (100), other types of fluid ejection die may be implemented, such as a piezoelectric inkjet fluid ejection die (100).

Figure 5:
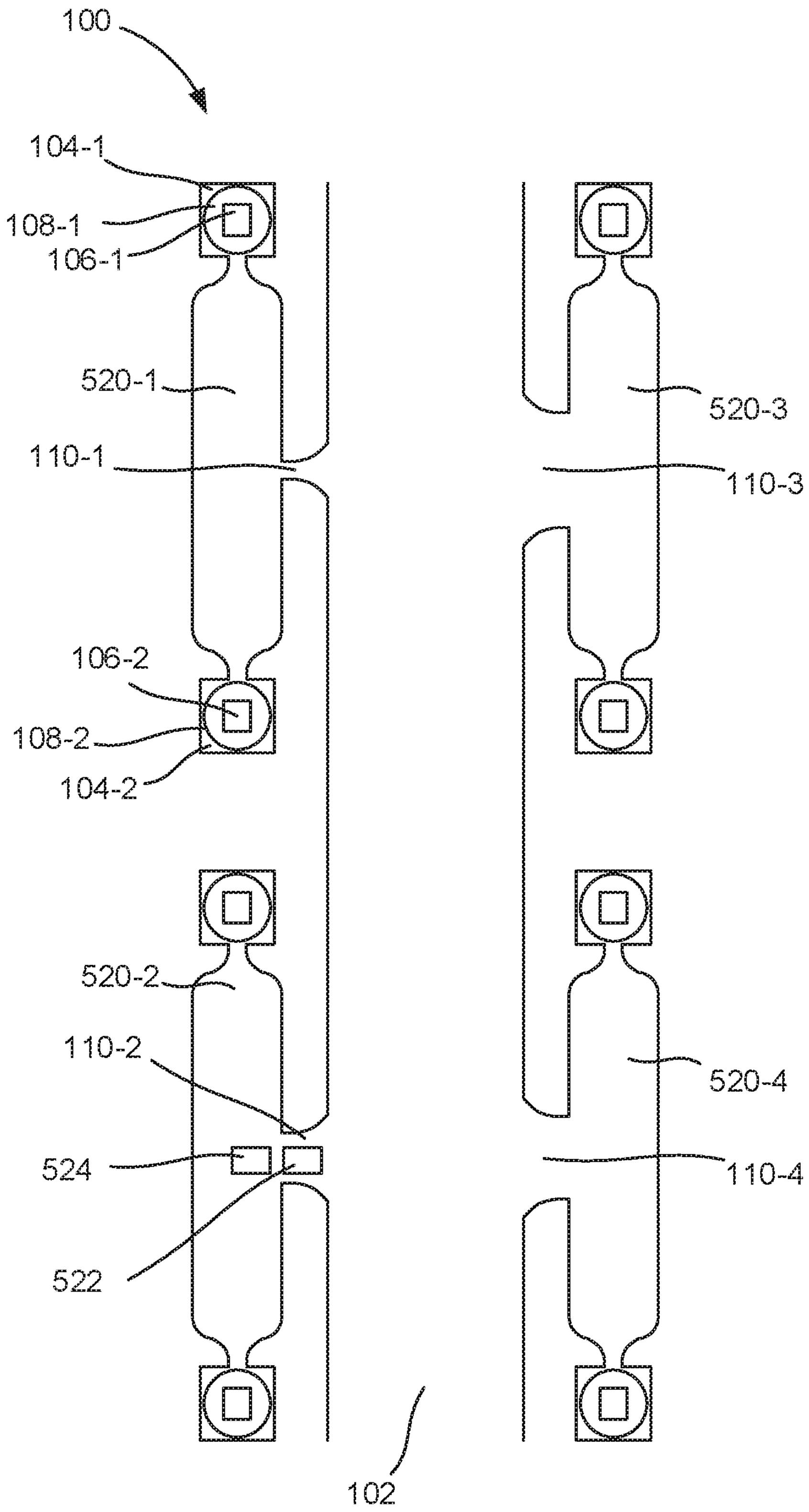
FIG. 5 is a top view of a fluid ejection die with antechamber sidewalls that curve inward, according to an example of the principles described herein.

The fluid ejection die (100) also includes a number of antechambers (110). The antechamber (110) connects the ejection chambers (104) with the fluid feed slot (102) and passes the cells to be analyzed to the respective ejection chamber (104). In other words, the antechambers (110) are inlets to allow fluid to be ejected to pass from the fluid feed slot (102) into a position where it can be acted upon by the fluid actuator (106). In some examples, there may be a 1:1 relationship between antechambers (110) and ejection chambers (104). That is, each antechamber (110) may deliver fluid to just one ejection chamber (104). In other examples, a single antechamber (110) may deliver fluid to multiple ejection chambers (104) as depicted in FIG. 5 below.

As described above, cells such as live mammalian cells may have a heightened susceptibility to cellular damage and/or destruction. Specifically, increased levels of shear stress may cause any number of previously described changes to the cell, which changes may obfuscate analytic results and if severe enough may render such analysis impossible as damaged cells may not be able to be used for downstream operations. Accordingly, the antechamber (110) of the present specification includes features to allow for effective and efficient ejection of living cells. Specifically, each antechamber (110) includes sidewalls that curve inward.

That is, rather than having straight-faced tapered funnel walls, the antechamber (110) includes a curved surface which provides a gentle transition from the fluid feed slot (102) to the ejection chamber (104). That is, the antechamber (110) is designed to maintain cell viability as cells are dispensed. Specifically, the smoothed edges allow for less fluid flow disruption and decrease the chance of the cell experiencing the negative effects of high shear stress. In some examples, the curved surface has a single radius of curvature.

More specifically, the curved sidewalls are free of acute angle corners and right-angle corners which are potential sites of cell accumulation. Moreover, the antechamber (110) is free of other obstructions such as pillars. That is, in some examples, fluidic die include pillars to catch debris. However, the cells which may be targeted for analysis may accumulate and become blocked by these pillars. Accordingly, removing the pillars promotes increased flow for cells which are particularly prone to be hindered by the pillars. Moreover, the antechamber (110) with sidewalls that curve inward reduces the likelihood of cells getting stuck in the stress zone, thus increasing the volume/number of cells that are dispensed. Such an antechamber (110) also enhances the ability to perform more accurate single-cell dispensing and decreases cell miscounts which may result for example by accidentally identifying debris as a cell.

In some examples, an outlet of the antechamber (110) into the ejection chamber (104) may be larger as compared to other non-cellular specific fluid ejection die (100). While cells may be able to squeeze through a smaller opening, such squeezing may induce increased shear stress on the cell which can cause the aforementioned situations which can damage and/or destroy target cells. Accordingly, by including an antechamber (110) with increased outlet sizes, the cells experience less shear stress which enhances cell viability.

As described above, the fluid ejection die (100) may be used in an inkjet-based cell dispensing system. By using inkjet components such as openings (108) and fluid actuators (106) disposed within the micro-fluid ejection chambers (104), low-volume dispensing of fluids such as those used in life science and clinical applications is enabled. Examples of such applications include compound secondary screening, enzyme profiling, dose-response titrations, polymerase chain reaction (PCR) miniaturization, microarray printing, drug-drug combination testing, drug repurposing, drug metabolism and pharmacokinetics (DMPK) dispensing and a wide variety of other life science dispensing.

Figure 2:
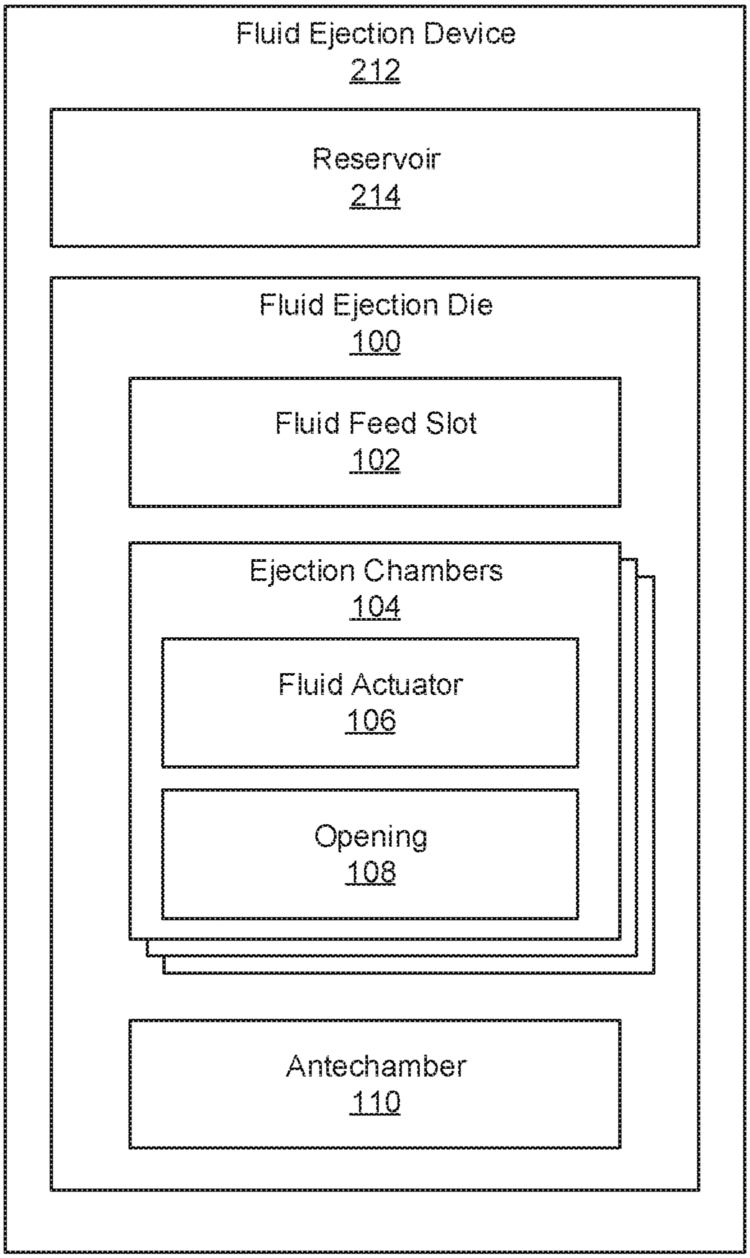
FIG. 2 is a block diagram of a fluid ejection device with antechamber sidewalls that curve inward, according to an example of the principles described herein.

FIG. 2 is a block diagram of a fluid ejection device (212) with antechamber (100) sidewalls that curve inward, according to an example of the principles described herein. Each fluid ejection device (212) includes a reservoir (214). The reservoir (214) receives a quantity of fluid. In some examples, the reservoir (214) is open, or exposed, so that a user, either manually or via a machine-operated multichannel pipette, can fill the reservoir (214) with the target fluid.

Each fluid ejection device (212) also includes a fluid ejection die (100). That is, a fluid ejection die (100) may be paired with a reservoir (214) to be referred to as a fluid ejection device (212). The fluid ejection die (100) is fluidly coupled to the reservoir (214). That is, during operation, fluid from the reservoir (214) is passed to a fluid ejection die (100) where it is ejected onto a surface.

In some cases, the fluid ejection devices (212) operate to dispense picoliter quantities of a target fluid into the wells. For example, the fluid ejection devices (212) may have fluid ejection die (100) with fluid actuators (106) and openings (108) that eject between 5 to 300 picoliters of a given fluid per ejection event.

As described above, the fluid ejection die (100) includes a fluid feed slot (102) to receive fluid from the reservoir (214) and an array of ejection chambers (104) fluidly connected to the fluid feed slot (102) to receive fluid from the fluid feed slot (102). Each ejection chamber (104) includes 1) at least one fluid actuator (106) to eject fluid through an opening (108) and 2) the opening (108) through which fluid is to be ejected. Each fluid ejection die (100) also includes a number of antechambers (110) which include sidewalls that curve inward. As described above, an antechamber (100) may deliver fluid to one or multiple ejection chambers (104).

Figure 3:
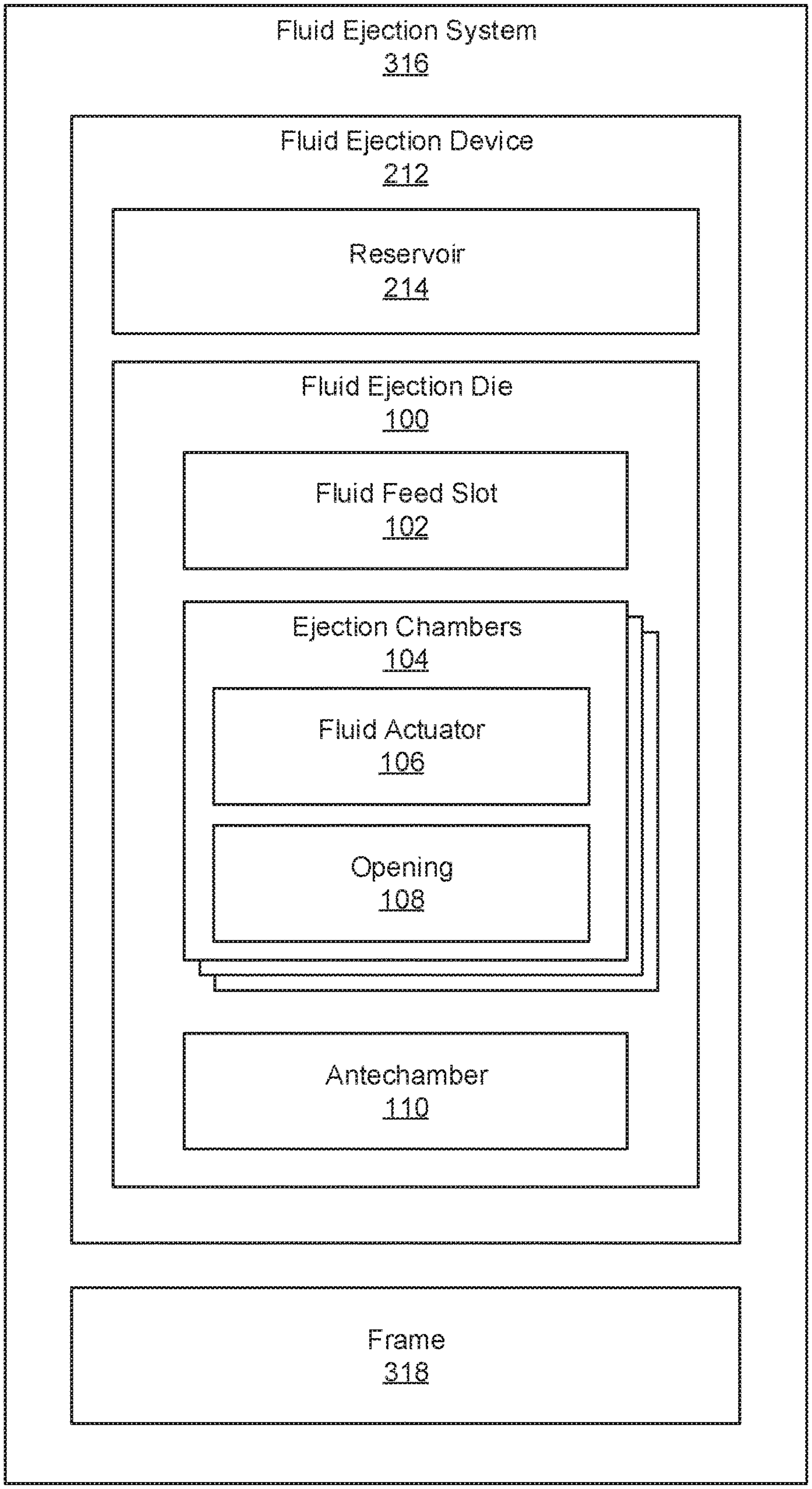
FIG. 3 is a block diagram of a fluid ejection system with antechamber sidewalls that curve inward, according to an example of the principles described herein.

FIG. 3 is a block diagram of a fluid ejection system (316) with antechamber (110) sidewalls that curve inward, according to an example of the principles described herein. As described above, the fluid ejection system (316) ejects fluid onto a surface. To eject the fluid, a fluid ejection controller passes control signals and routes them to fluid ejection devices (212) of the fluid ejection system (316).

As described above, each fluid ejection device (212) includes a reservoir (214) to receive a quantity of fluid and at least one fluid ejection die (100). Also as described above, each fluid ejection die (212) includes a fluid feed slot (102) to receive fluid from the reservoir (214) and an array of ejection chambers (104) fluidly connected to the fluid feed slot (102).

The fluid ejection system (316) also includes a frame (318) to retain the number of fluid ejection devices (212). The frame (318) may be formed of any material, such as a plastic. The frame (318) may be injection molded or otherwise formed of a thermoplastic material.

In some examples, the frame (318) holds multiple fluid ejection devices (212). That is, the frame (318), which is removable from a system that analyzes the fluid, may allow a user to simultaneously transport multiple fluid ejection devices (212) at a time.

Figure 4A:
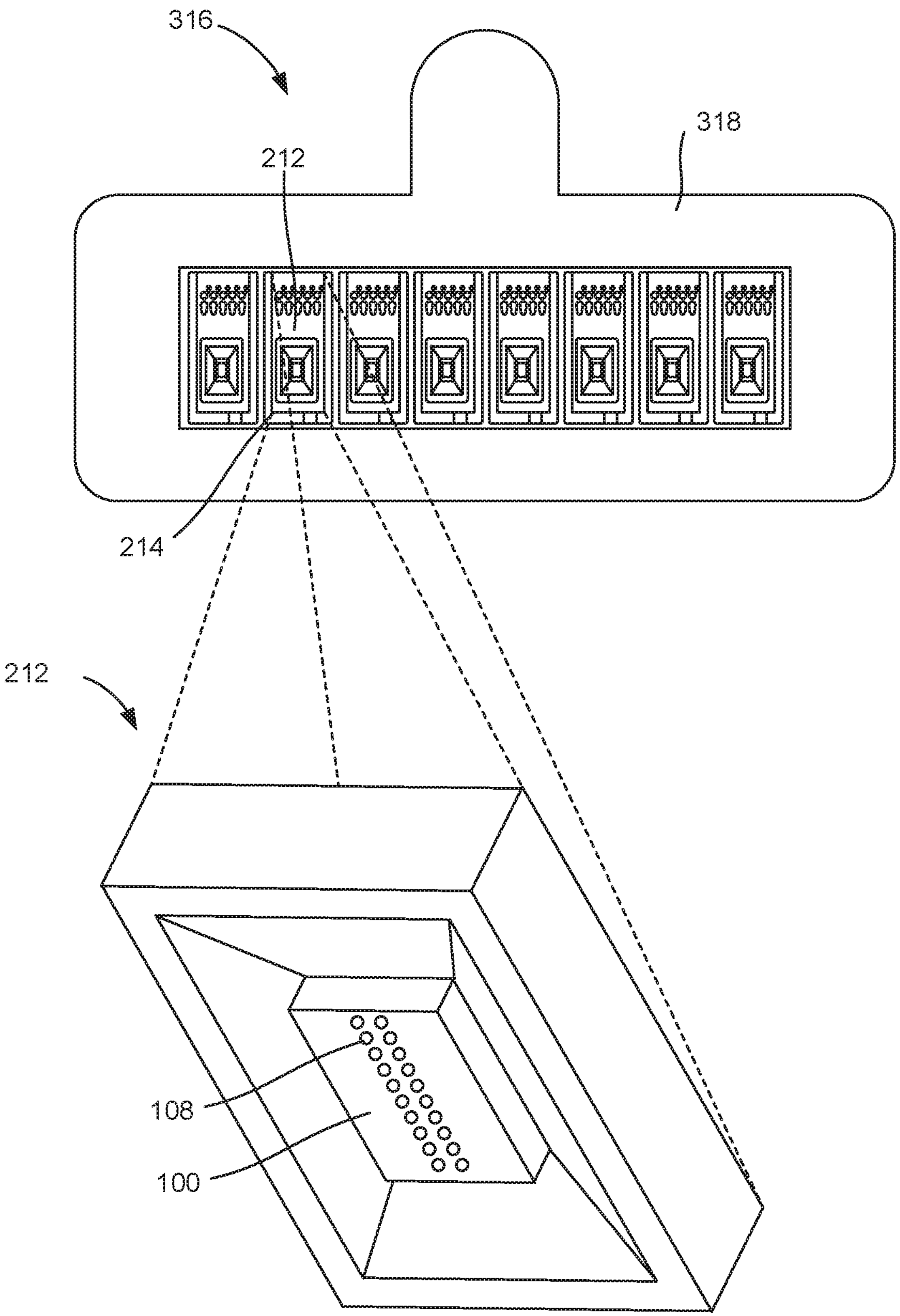
FIG. 4A is a view of a fluid ejection system and a fluid ejection device with antechamber sidewalls that curve inward, according to an example of the principles described herein.
Figure 4B:
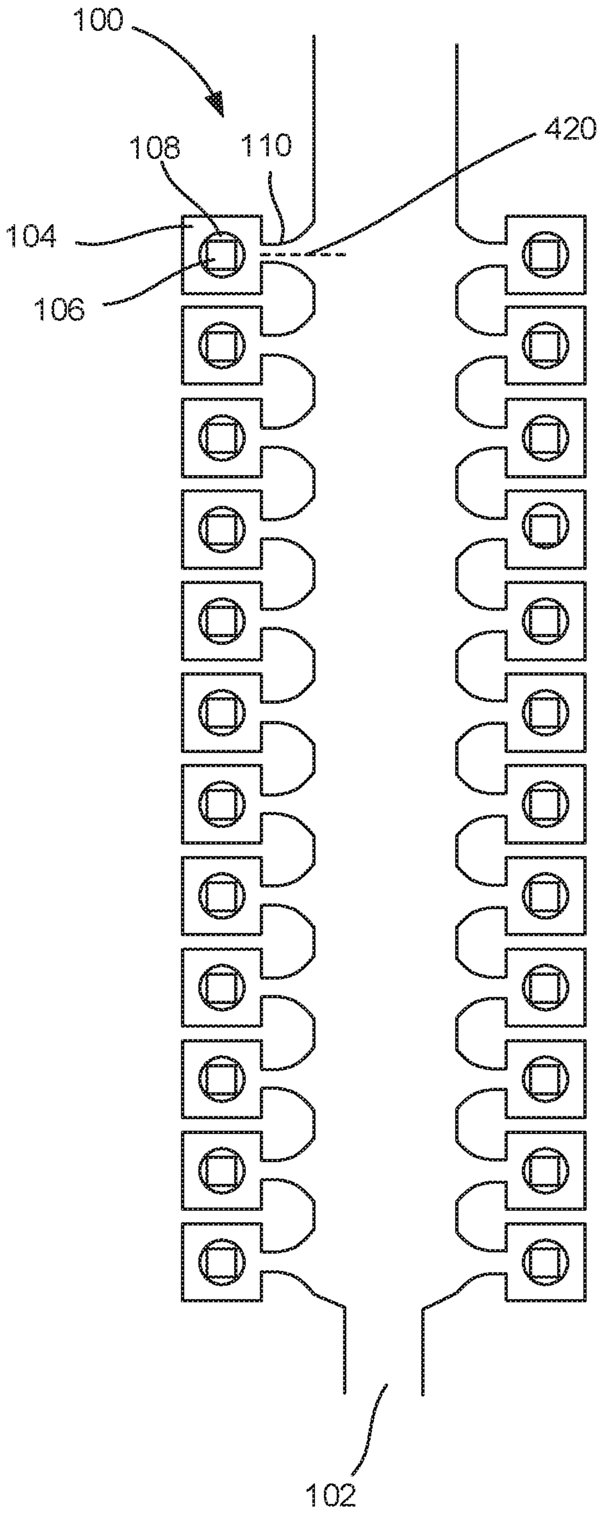
FIG. 4B is a top view of the fluid ejection device with antechamber sidewalls that curve inward, according to an example of the principles described herein.

FIG. 4A is a view of a fluid ejection system (316) and a fluid ejection device (212) with antechamber (FIG. 1, 110) sidewalls that curve inward, according to an example of the principles described herein. Specifically, FIG. 4A depicts a top view of a fluid ejection system (316) including a fluid ejection device (212). FIG. 4A clearly depicts the frame (318) that is used to manipulate the multiple fluid ejection devices (212) retained therein. In this example, each fluid ejection device (212), is a separate structure. For simplicity, in FIG. 4A one fluid ejection device (212) is indicated with a reference number.

In some examples the frame (318) also houses circuitry to activate each of the fluid actuators (FIG. 1, 106). That is, each of the fluid actuators (FIG. 1, 106) may be individually addressable and may activate based on control signals from a fluid ejection controller. Specifically, the frame (318) includes electrical connections and traces. Some electrical connections interface with corresponding connections on a fluid ejection controller and other electrical connections interface with corresponding connections on the fluid ejection device (212). During operation, a fluid ejection controller passes control signals to the fluid ejection system (316). Any number of control signals may be passed. For example, ejection signals may activate fluid actuators (FIG. 1, 106) on the fluid ejection devices (212) to eject fluid. Other types of signals include sensing signals to activate a sensor to collect data regarding the fluid ejection device (212) or a fluid passing through the fluid ejection device. While specific reference is made to particular control signals generated and/or passed, any number and type of control signals may be passed to the fluid ejection device (214).

FIG. 4A also clearly depicts a top view of the reservoir (214). As depicted in FIG. 4A, in some examples, the reservoir (214) is an open reservoir (214). That is, a user may insert fluid directly into the reservoir (214) using a single-channel or multi-channel pipette. In this example, as the fluid ejection system (316) is a multi-device system (316), the multiple reservoirs (214) can be filled simultaneously via a multi-channel pipette.

FIG. 4A also depicts the fluid ejection device (212) removed from the frame (318) and the openings (108) of the ejection chamber (FIG. 1, 104) array. Note however that the size of the openings (108) is not to scale relative to the size of the fluid ejection die (100), with the openings (108) being enlarged for reference.

As depicted in FIG. 4A, the reservoir (214) may be on an opposite side of a respective fluid ejection die (100). As described above, a fluid ejection device (212) refers to a reservoir (214) and a fluid ejection die (100) and a fluid ejection system (316) refers to the fluid ejection device (212) and a frame (318) that houses the fluid ejection device (212).

FIG. 4B is a top view of the fluid ejection device (212) with antechamber (110) sidewalls that curve inward, according to an example of the principles described herein. FIG. 4B specifically depicts the fluid feed slot (102) and the arrays of ejection chambers (104). For simplicity in FIG. 4B, just one instance of an ejection chamber (104), fluid actuator (106), and opening (108) is indicated with a reference number. In some examples, ejection chambers (104) are disposed on either side of the fluid feed slot (102).

FIG. 4B also depicts the antechamber (110) with sidewalls that curve inward. That is, the sidewalls of the antechamber (110) bulge inwards towards a centerline (420) of the antechamber (110). Doing so provides a smooth surface, rather than one defined by sharp or acute angles, such that cells may pass by without accumulating in the antechamber (110) and are directed to the respective ejection chamber (104).

Each antechamber (110) includes an outlet that refers to a location where the cells and/or fluid leave the antechamber (110) and enter another structure, such as the ejection chamber (104). In this example, the antechamber (110) outlet is narrower than other portions of the antechamber (110). That is, the antechamber (110) becomes narrower as it approaches an entry into the ejection chamber (104).

As described above, this opening of the antechamber (110) into the ejection chamber (104) may allow for particularly effective for analyzing certain types of cells such as live mammalian cells. For example, the antechamber (110) outlet may be between 65% and 75% of a diameter of a cell to be ejected from the respective ejection chamber (104). As a particular example, an HEK 293t cell has a diameter of around 14 micrometers (μm). Accordingly, the antechamber (110) outlet may be 9.8 μm.

In some examples, the antechamber (110) is sized to impart a predetermined level of shear stress on cells that flow to a respective ejection chamber (104). That is, as has been previously described, negative effects may result due to the application of too much shear stress on a cell. However, it may be the case that some damage to the membrane of the cell is desirable. For example, it may the case that a cell is to be imaged. Imaging of a cell is made easier if the cell has been transfected with a fluorescent protein. Accordingly, by somewhat damaging the cell, the cell is more easily transfected such that they can be imaged afterwards. Put another way, increasing/decreasing a width of the antechamber (110) outlet has an effect on the amount of shear stress a cell receives. In cases where an increased amount of shear stress is desired, the antechamber (110) outlet dimensions, and other dimensions may be smaller.

As is clearly depicted in FIG. 4B, the antechamber (110) reduces clogging, rupture, and clotting of cells within the antechamber (110). For example, each antechamber (110) may be free of acute angle corners and right-angle corners, which provide sites for cell accumulation. Still further, each antechamber (110) may be hollow, that is without internal structures such as pillars, which similarly may provide sites for cell accumulation and blockage. Accordingly, by providing an antechamber (110) that is hollow and free of such features, fluid and cell flow is promoted in a way as to increase the viability of the cells.

Accordingly, the fluid ejection die (100) as depicted herein maintains cell viability as cells are dispensed. For example, given a pre-dispense cell viability of 93%, cell viability may be as low as 75% when such structural features (sharp corners, obstructions, small outlets) are present. However, with an antechamber (110) geometry that curves inward, is sized based on the cell, and does not include right angle corners, acute angle corners, or pillars, and a pre-dispense viability of 96%, a post-dispense viability may be as high as 94% or higher.

As described above, such an antechamber (110) also enhances fluid flow. That is, when working with certain cells using other designs, cells are more prone to rupture as they exit the stress zone such that their contents are expelled and can aggregate and increase the chance of clogging the fluid ejection die (100). Moreover, pillars inside the unoptimized funnel would also trap cells inside the stress zone, which eventually led to complete fluid flow blockage. Such clogging behaviors are less prevalent in the antechamber (110) with inwardly curving walls that is free from obstructions. Such a fluid ejection die (100) also provides new sensor capabilities as depicted below in connection with FIG. 5.

FIG. 5 is a top view of a fluid ejection die (100) with antechamber (110) sidewalls that curve inward, according to an example of the principles described herein. As with the other figures, FIG. 5 clearly depicts the fluid feed slot (102). In the example depicted in FIG. 5, the fluid ejection die (100) includes a corridor (520) per antechamber (110) to direct fluid to multiple ejection chambers (104). For example, a first antechamber (110-1) leads to a first corridor (520-1) which leads to 1) a first ejection chamber (104-1) with a first fluid actuator (106-1) and a first opening (108-1) and 2) a second ejection chamber (104-2) with a second fluid actuator (106-2) and a second opening (108-2). For simplicity, a few instances of each of the opening (108), fluid actuator (106), ejection chamber (104), and corridor (520) are identified with reference numbers.

As depicted in FIG. 5, in some cases, the different antechambers (110) on the fluid ejection die (100) may be sized differently. Accordingly, in this example a single fluid ejection die (100) could be used to operate on multiple cells rather than having to develop a new fluid ejection die (100) for each cell to be analyzed. That is, different antechamber (110) dimensions allow the same fluid ejection die (100) to be used to process different cells. That is, a fluid ejection die (100) may process cells of a first type and/or size. A fluid ejection die (100) having the same configuration may process cells of a different type and/or size. As a particular example, FIG. 5 depicts a single fluid ejection die (100) which has four antechamber (110) combinations to accommodate four different cell sizes and/or different operations.

The size of the antechamber (110) outlet is selected based on at least one of a type of a cell to be ejected, a size of the cell to be ejected, a downstream operation to carry out on the cell to be ejected, and a desired level of shear stress to apply to the cell to be ejected. As a first example, the size of the cell may define the size of the antechamber (110) outlet. For example, as described above, it may be that an antechamber (110) outlet into a corridor (520) is to be 70% of a diameter of a cell to be analyzed. Specifically, a first antechamber (110-1) may be intended to analyze a cell having a 12 micrometer (μm) diameter such that the outlet into the corridor (520-1) has a diameter of 8.4 (μm). A second antechamber (110-2) may be intended to analyze a cell which has a 14 (μm) size such that the second antechamber (110-2) outlet to the second corridor (520-2) has a diameter of 9.8 (μm). Still further, a third antechamber (110-3) may be intended to analyze a cell which has a 20 (μm) size such that the third antechamber (110-3) outlet to the third corridor (520-3) has a diameter of 14 (μm). As yet another example, a fourth antechamber (110-4) may be intended to analyze a cell having a diameter of 16 (μm) such that the fourth antechamber (110-4) outlet to the fourth corridor (520-4) has a diameter of 11 (μm). Accordingly, the single fluid ejection die (100) can be used such that a laboratory can stock a single product, but use that single product in different applications.

Each fluid actuator (106) may be individually actuatable to draw fluid to a respective ejection chamber (104). For example, if a first cell is to be operated upon as determined by user input, the first and second fluid actuators (106-1, 106-2) may be actuated. As described above, the actuation of these actuators (106-1, 106-2) generates capillary forces which draws fluid towards them. Accordingly, by activating the fluid actuators (106-1, 106-2) that correspond to a particular antechamber (110), cells will be drawn to that antechamber (110) and respective ejection chambers (104). During this time, the other fluid actuators (106) may not be activated so that they do not draw any cells towards them.

In similar fashions, depending on a type of cell indicated, various of the fluid actuators (106-1, 106-2) may be activated to draw fluid to a particular ejection chamber (104). That is, a user can direct to which ejection chambers (104) cells are to pass, and the fluid ejection system (FIG. 3, 316) may activate respective fluid actuators (106) to draw the cells to that ejection chamber (104).

As another example, a type of cell to be analyzed may be used to size an antechamber (110). For example, an antechamber (110) outlet may have a size based on a cell line and fragility. For example, an HEK 293t cell has a diameter of around 14 μm, and an antechamber (110) outlet may have a cross-sectional size of 9.8 μm. However, if a cell of a different line is the same size as an HEK cell, but is more fragile/susceptible to the effects of shear forces, a larger antechamber (110) outlet may be used. In any of these examples, a user can input which cell line they are dispensing and the instrument will direct the cells to the appropriate ejection chamber (104) as defined by the antechamber (110) outlet characteristics.

As yet another example, downstream operations to be carried out on the cell to be ejected may determine a size of the antechamber (110) outlet. For example, a scientist may intend to increase a cell wall permeability. In this example, a size of the antechamber (110) outlet may be reduced to accommodate for a nominal amount of shear so as to increase the cell wall permeability such that a downstream marking of the cell may be more effectively performed. As described above, the fluid die (100) may have antechambers with two different geometries, different geometries being based on different downstream operations to be carried out on a cell. In a particular example, one antechamber (110)

may be designated for shear poration and another designated for non-shear poration cell dispensing. The user can input into the instrument which application and/or cell type they are working with, and the fluid ejection system (FIG. 3, 316) may direct the cell through the matching antechamber (110) given the input.

In some examples, the fluid ejection system (FIG. 3, 316) includes a sensor disposed in the antechamber (110), a fluid feed slot (102), a corridor (520) or combinations thereof. The sensor may include a pair of electrodes (522, 524). Such a sensor allows for the enhanced detection of single cells. For example, the antechamber (110) shape allows for the two electrodes (522, 524) to be located closer together, which enhances the probability that the fluid ejection system (FIG. 3, 316) will correctly identify single cells.

Accordingly, such a fluid ejection die (100) allows a user to choose from multiple different applications on one single fluid ejection die (100) due to the different antechamber (110) dimensions with different properties.

An example of the use of the fluid ejection die (100) is now presented. In this example, a scientist may use the fluid ejection die (100) to dispense a sample of HEK 293t cells into well plates for analysis. In this example, as described above, using either a single channel pipette or a multi-channel pipette, a scientist may deposit a solution including the HEK 293t cells into an open reservoir (FIG. 2, 214) on a top surface of the fluid ejection device (FIG. 2, 212). This solution is routed to the fluid ejection die (100).

As described above, the fluid ejection die (100) may include antechambers (110) with different sizes. Cells may be directed towards a particular antechamber (110) based on the properties of the cell. Accordingly, the scientist, via a user interface, may input that the cell they are working on is an HEK 293t cell. Via this user interface, the scientist may input other information, such as specific characteristics of the cell. For example, during prior experimentation, certain characteristics of the cell sample may have been determined, which could affect to which antechamber (110) the cells are directed. In this example, the user may input such information, which information may include cell deformability.

The user may input other information as well. For example, the user may input an indication of a target surface onto which the cells are to be dispensed. For example, the scientist may indicate that the HEK 293t cells are to be ejected into different wells of a titration plate or may indicate that they are ejected onto other surfaces.

Based on this input, particular fluid actuators (106) may be activated to draw the HEK 293t cells towards a desired antechamber (110). For example, as described above, a second antechamber (110-2) may be intended to analyze a cell which has a 14 (μm) size such that the second antechamber (110-2) outlet to the second corridor (520-2) has a diameter of 9.8 (μm). Given that the HEK 293t cell has a diameter of around 14 micrometers (μm), it may be that this HEK 293t cell is to be directed towards the second antechamber (110-2). Accordingly, a controller of the analysis device in which the fluid ejection system (FIG. 3, 316) is disposed may send an electrical signal to activate the corresponding fluid actuators (106) that correspond to the second antechamber (110-2). The capillary action resulting from the activation of those fluid actuators (106) draws the HEK 293t cells towards the second antechamber (110-2).

Note that in this example, the fluid actuators (106) associated with the other antechambers (110) are not activated, such that the HEK 293t cells are not drawn towards the respective first, third and fourth antechambers (110-1, 110-3, 110-4).

Returning to the second antechamber (110-2). The activation of the associated fluid actuators (106) draws the cells in that direction, where the cells flow through the second antechamber (110-2), into the second corridor (520-2) and in either direction towards a respective fluid actuator (106). The fluid actuators (106) continue to fire even when a particular cell is disposed therein such that HEK 293t cells are ejected onto the target surface.

In summary, using such a fluid ejection die 1) provides an inkjet-based cell dispense operation with reduced shear force; 2) decreases the likelihood of the cells experiencing adverse effects; 3) provides a smooth antechamber to reduce a likelihood of cells clogging the sense zone and thus increases fluid ejection device life; 4) achieves a desired amount of applied shear stress to make cell walls permeable for applications such as transfection; 5) provides a single fluid ejection device with multiple different antechamber geometries tailored for different applications to allow a single product to be used in different applications rather than having a different product for each application; and 6) enhances single cell identification by the dispenser. However, the devices disclosed herein may address other matters and deficiencies in a number of technical areas.

What is claimed is:

1. A fluid ejection die, comprising:

a fluid feed slot to receive fluid from a reservoir;

an array of ejection chambers fluidly connected to the fluid feed slot, wherein each ejection chamber comprises:

at least one fluid actuator; and an opening through which fluid is to be ejected; and a number of antechambers to direct fluid towards the ejection chambers, wherein each antechamber comprises sidewalls that curve inward.

2. The fluid ejection die of claim 1, wherein an antechamber outlet is narrower than other portions of the antechamber.

3. The fluid ejection die of claim 1, further comprising a corridor per antechamber to direct fluid to multiple ejection chambers.

4. The fluid ejection die of claim 3, further comprising a sensor disposed in at least one of the antechamber, the fluid feed slot, and the corridor.

5. The fluid ejection die of claim 1, wherein different antechambers on the fluid ejection die are sized differently.

6. The fluid ejection die of claim 1, wherein a size of an antechamber is selected based on at least one of:

a type of a cell to be ejected;

a size of the cell to be ejected;

a downstream operation to carry out on the cell to be ejected; and a desired level of shear stress to apply to the cell to be ejected.

7. The fluid ejection die of claim 1, wherein an antechamber outlet has a cross-sectional area between 65% and 75% of a diameter of a cell to be ejected from a respective ejection chamber.

8. The fluid ejection die of claim 1, wherein each fluid actuator is individually actuatable to draw fluid to a respective ejection chamber.

9. A fluid ejection device, comprising:

a reservoir to receive a quantity of fluid; and at least one fluid ejection die, each fluid ejection die comprising:

a fluid feed slot to receive fluid from the reservoir;

an array of ejection chambers fluidly connected to the fluid feed slot to receive fluid from the fluid feed slot, wherein each ejection chamber comprises:

at least one fluid actuator to eject fluid through an opening; and the opening through which fluid is to be ejected; and a number of antechambers, wherein an antechamber comprises sidewalls that curve inward.

10. The fluid ejection device of claim 9, wherein the reservoir is an open reservoir.

11. The fluid ejection device of claim 9, wherein the antechamber is free of acute angle corners and right-angle corners.

12. The fluid ejection device of claim 9, wherein ejection chambers are disposed on either side of the fluid feed slot.

13. The fluid ejection device of claim 9, wherein a reservoir is on an opposite surface of a respective fluid ejection die.

14. A fluid ejection system, comprising:

a number of fluid ejection devices, each fluid ejection device comprising:

a reservoir to receive a quantity of fluid; and at least one fluid ejection die, the fluid ejection die comprising:

a fluid feed slot to receive fluid from the reservoir;

an array of ejection chambers fluidly connected to the fluid feed slot to receive fluid from the fluid feed slot, wherein each ejection chamber comprises:

at least one fluid actuator to eject fluid through an opening; and the opening through which fluid is to be ejected; and a number of antechambers, wherein an antechamber comprises sidewalls that curve inward; and a frame to retain the number of fluid ejection devices.

15. The fluid ejection system of claim 14, wherein each antechamber is sized to impart a predetermined level of shear stress on cells that flow to a respective ejection chamber.

* * * * *